Nov. 4, 1947.    N. GEERTSEN    2,430,010
METHOD OF PRODUCING CAN BODIES
Filed July 28, 1943    2 Sheets-Sheet 1
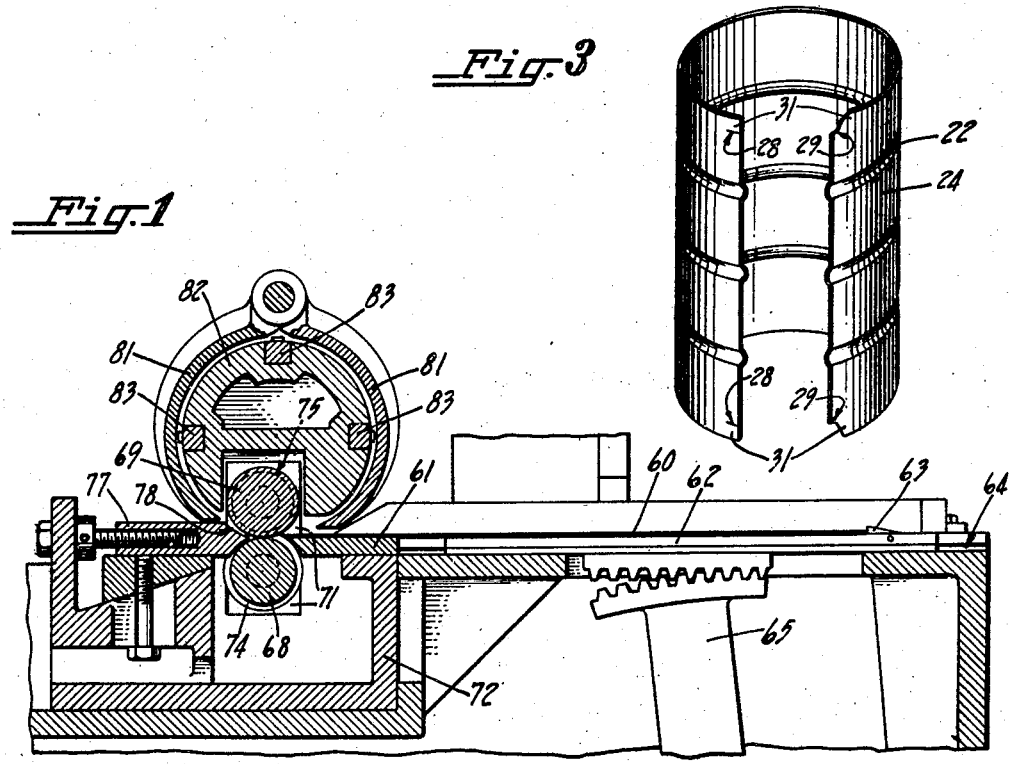
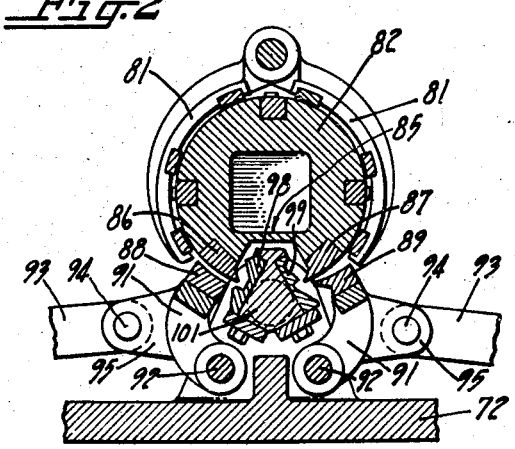
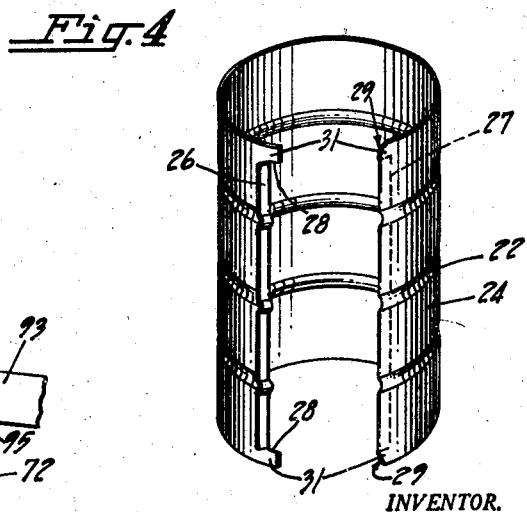
INVENTOR.
Nelson Geertsen
BY Ivan D. Thornburgh
Charles H. Erne
ATTORNEYS Nov. 4, 1947.  N. GEERTSEN  2,430,010
METHOD OF PRODUCING CAN BODIES
Filed July 28, 1943 2 Sheets-Sheet 2
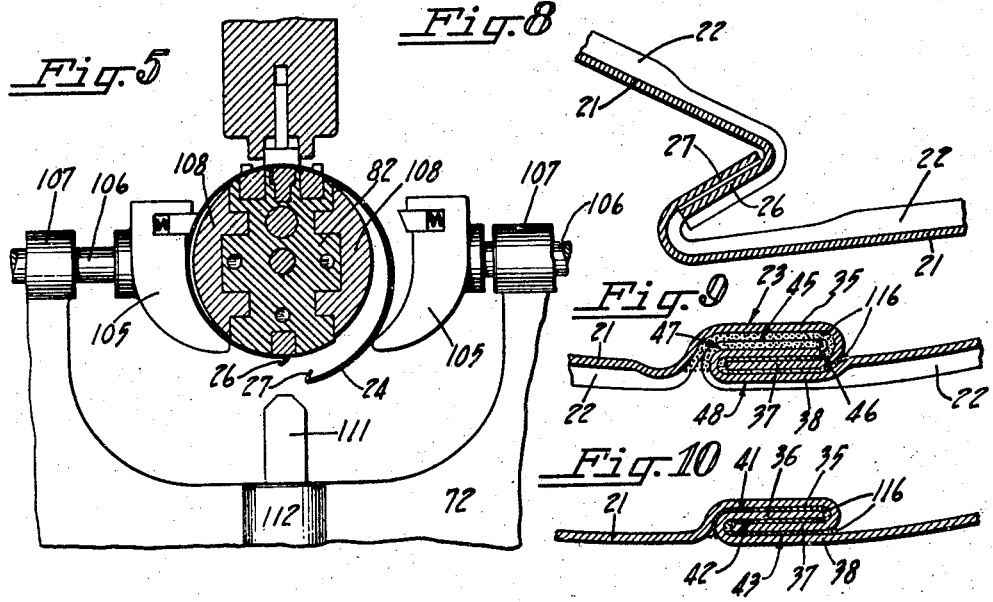
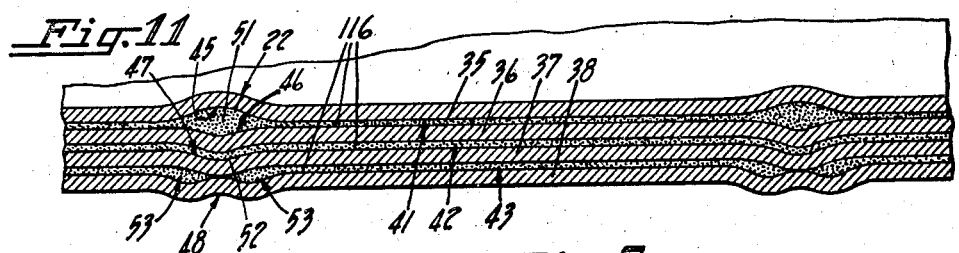
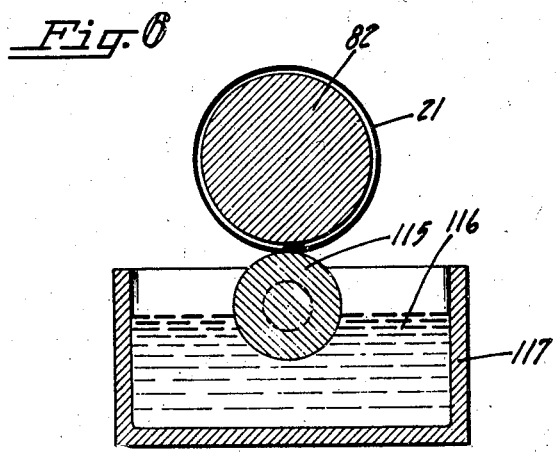
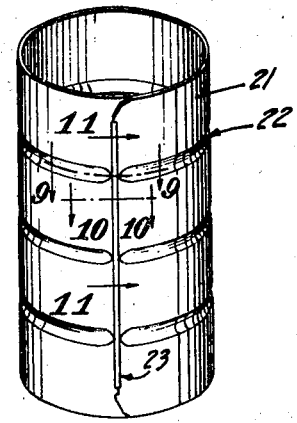
INVENTOR.
Nelson Geertsen
BY Ivan D. Thornburgh
Charles H. Erne
ATTORNEYS Patented Nov. 4, 1947

2,430,010

UNITED STATES PATENT OFFICE 2,430,010

METHOD OF PRODUCING CAN BODIES

Nelson Geertsen, Chicago, Ill., assignor to American Can Company, New York, N. Y., a corporation of New Jersey Application July 28, 1943, Serial No. 496,490

2 Claims. (Cl. 113—120)

The present invention relates to a method of producing reenforced sheet metal can bodies having locked and soldered side seams and has particular reference to shaping and uniting in a lock seam the side seam edges of sheet metal can bodies having reenforcing beads that extend into and across the seam edges of the blanks to provide vent channels in the seam for subsequent soldering and reenforcement of the seam.

In the manufacture of light weight sheet metal cans made from reduced thickness stock it is often desirable to form annular beads in the body wall to impart strength and rigidity to the body. In such cans it is also desirable to strengthen the soldered side seams by insuring that the numerous layers of metal which make up the seam are securely bonded together.

Numerous ways have been suggested of forming reenforcing beads in the body of a can made from relatively light weight material but difficulty has been encountered at the side seam of such a body by reason of the lesser body wall thickness. The present invention contemplates overcoming this difficulty by a two purpose method of making such light weight cans. In this dual method the reenforcing beads are formed in the can body blank before its side seam edges are locked together so that the beads may be easily and economically rolled from edge to edge of the blank without thought of endwise registry and the end portions of the beads that extend across the side seam edges of the blank then are incorporated in the side seam in such a manner as to provide vent channels for the escape of trapped air in the seam when the latter is soldered. Such procedure strengthens the seam as well as the body wall thus making it possible to use thinner gauge stock material.

An object therefore of the invention is the provision of a method of producing light weight reenforced sheet metal can bodies having soldered lock side seams wherein the body is formed with a reenforcing bead which extends across the side seam edges of the partially formed body and such a bead as modified during the can body manufacture is incorporated in the side seam to provide vent channels for improved venting during subsequent soldering of the seam.

Numerous other objects and advantages of the invention will be apparent as it is better understood from the following description, which, taken in connection with the accompanying drawings, discloses a preferred embodiment thereof.

Referring to the drawings:

Figures 1 and 2 are respectively longitudinal and transverse vertical sectional views of one form of apparatus for carrying out some of the method steps of the instant invention, with parts broken away;

Figs. 3 and 4 are perspective views of a partially finished can body showing two stages of manufacture of the body as carried out in the apparatus of Figs. 1 and 2, Fig. 3 showing the body after being formed into shape and after the reenforcing beads have been pressed therein, and Fig. 4 illustrating the beaded body after edging, i. e., with its side seam hooks;

Figs. 5 and 6 are transverse vertical sectional views of different parts of the apparatus for carrying out other of the method steps of the invention, with parts broken away;

Fig. 7 is a perspective view of a finished can body having longitudinally spaced circumferential reenforcing beads and a soldered lock side seam;

Fig. 8 is an enlarged fragmentary transverse sectional view showing how the side seam hooks of the can body are interengaged prior to interlocking them to produce the body side seam;

Figs. 9 and 10 are enlarged transverse sectional views showing the side seam hooks interlocked and soldered to form the body side seam, the respective views being taken substantially along the lines 9—9 and 10—10 in Fig. 7, with parts broken away; and Fig. 11 is an enlarged fragmentary longitudinal vertical section of the body side seam, the view being taken substantially along the line 11—11 in Fig. 7.

As a preferred embodiment of the instant invention the drawings illustrate apparatus for and method steps of producing cylindrical light weight sheet metal can bodies 21 (Fig. 7) having longitudinally spaced body reenforcing beads 22 and a vented and reenforced side seam 23. The bodies are made preferably from flat rectangular blanks.

In the manufacture of such bodies, the blanks are curled or formed into curved tubular shape, as best shown in Fig. 3, and as an incident to such forming the reenforcing beads 22 are rolled in the body wall. For the average height of can body there will be a plurality of these reenforcing beads arranged in spaced and parallel relation and extending entirely around the body and across its side seam edges from one blank edge to the other. Fig. 3 shows such a partially completed can body which will be referred to by the numeral 24.

Following the beading and body forming operation, the partially completed body is edged, that is, the side seam edges are bent in opposite directions. This produces two reversely bent side seam hooks which are commonly referred to as an inside hook 26 (Fig. 4) and an outside hook 27. These are conventional lock and lap side seam hooks the hooks extending along the major portion of the seam and between the usual slits indicated at 28 (see also Fig. 3) and notches 29 which set off lap portions 31 at the ends of the seam. The hooks 26, 27 of the edged side seam extend across the reenforcing beads 22 and thus the end portions of the beads are included in the hooks. This is shown best in Fig. 4.

After edging the side seam hooks are brought together in overlapping relation as shown in Fig. 5 and are interengaged as disclosed in Fig. 8. While the hooks are in this interengaged position they are bumped or compressed into final interlocking form. This produces the locked side seam 23 having a plurality of layers of metal 35, 36, 37, 38 (see Figs. 9, 10 and 11) with spaces 41, 42, 43 therebetween. The layers 35, 37 form parts of the inside hook edge 26 while layers 36, 38 are parts of the outside hook edge 27.

During the bumping operation, the end portions of the reenforcing beads that are included in the hooks 26, 27 are considerably flattened or ironed out. However, enough of the beads remain in the hooks after the bumping operation to form shallow troughs 45, 46 (see also Fig. 11) in the inside hook 26 and similar troughs 47, 48 in the outside hook 27.

The troughs 45, 46 on adjacent surfaces of the layer 35 of the inside hook 26 and on the layer 36 of the outside hook 27 are in parallel registry with each other and set off a vent opening 51 which extends from the outside of the can body to the interior of the side seam. The back of the trough 46 of the layer 36 on the outside hook 27 and the trough 47 on the layer 37 of the inside hook 26 are in loosely meshed or nested relation. This sets off a vent opening 52 between the layers, which opening communicates with the vent opening 51.

The backs of the trough projections on adjacent surfaces on the layer 37 on the inside hook 26 and on the layer 38 of the outside hook 27 are in parallel registry and engage against each other. This sets off between them a pair of vent openings 53. These vent openings at one end communicate with the vent opening 52 and at the other end open into the inside of the body. This train of vent openings 51, 52, 53 disposed in the seam as a continuation of each of the body reenforcing beads 22, produces a plurality of circuitous vent channels in the seam.

As a final step in the manufacture of the can body 21, its side seam 23 is soldered by the usual application of fluid solder from the outside of the body. At such time the solder is forced into the spaces 41, 42, 43 between the layers 35, 36, 37, 38 of the seam in a more complete manner by reason of the vent channels, formed by the flattened bead sections in the seam hooks, permitting escape of air from the seam.

The escape of the trapped air permits of the more efficient introduction of the proper amount of solder into the seam. Such an improved manner of soldering results in a strengthening of the seam to such an extent that light weight reenforced bodies with both body wall and seam reenforced provide substantially the same protection against rupture due to internal pressure or rough handling as in the instance of previously known and manufactured cans having materially increased gauge or wall thickness.

The beading of the flat rectangular blank and the forming into body shape may be effected in an apparatus the principal parts of which are illustrated in Fig. 1. In this apparatus a flat blank (indicated by the numeral 60) is fed along a table 61 by a reciprocating feed bar 62 having a feed finger 63 mounted thereon. The feed bar slides in a groove 64 formed in the table and is reciprocated through a feeding stroke and thence through a return stroke by a rack and segment gear connection with a rocker level 65. The lever may be oscillated in any suitable manner.

Upon a feeding stroke of the feed bar 62, the blank is advanced into a grip of a pair of rotating combination feeding and beading rollers 68, 69 located one above the other so that the blank passes between them. These rollers are formed with trunnions which are journaled in bearing blocks 71 secured in a frame 72 which constitutes the main frame of the apparatus. The rollers are rotated at high speed in any suitable manner. The lower roller 68 is formed with a plurality of annular beading projections 74 which mesh with cooperating beading grooves 75 formed in the upper roller 69.

Hence as the leading edge of a blank 60 advancing along the table 61, comes into the grip of the rollers 68, 69 it is drawn into the bight of the rollers and further advanced therebetween. During this passage of the blank, the beading projections 74 and the walls of the grooves 75 impress the reenforcing beads 22 into the blank from end to end thereof, as shown in Fig. 3.

The forming of the blank into can body shape is effected by a forming tool 77 which is adjustably mounted on the main frame 72 closely adjacent the rollers 68, 69. The inner end of the tool is formed with a beveled deflecting surface 78 which is disposed in the path of travel of the beaded blank as it leaves the beading rollers.

The blank engaging against this deflecting surface as it is advanced by the rollers is deflected upwardly along a curved path of travel in the usual manner. A cylindrical shape results as shown in Fig. 3. Curved guide members 81 guide the curved blank into position onto a stationary mandrel or horn 82 along which it may be moved by feed bars 83 in a step-by-step manner through other stations for subsequent operations.

In this embodiment the beads 22 are inwardly extending so that the deflecting surface 78 of the forming tool has no flattening effect on the beads. Should outside beads be desired in the body wall, the deflecting surface 78 would be properly altered, as by grooving, to prevent any ironing out action of the beads during the body forming step.

Bending of the hooks 26, 27 along the side seam edges of the curved partially completed can body 24 is brought about at an edging station, illustrated in Fig. 2. This is one of the stations, above mentioned, located along the horn 82. The edging mechanism at such a station is of the type disclosed in United States Patent 1,875,353, issued September 6, 1932, to John F. Peters on a Can body maker.

At this station the bottom of the horn is formed with a recess 85 and is fitted with two hook nosed anvil irons 86, 87 disposed one on each side of the recess and secured in place on the horn. The partially completed body at rest on the horn at the edging station is clamped by a pair of hook nosed clamp heads 88, 89 which register with the respective anvil irons 86, 87. These clamp heads are secured to the upper ends of a pair of toggle levers 91 which are mounted on pivot pins 92 carried in the main frame 72.

The toggle levers 91 are rocked inwardly to bring the clamp heads into clamping position against the body blank and against the mandrel and are rocked outwardly to release the clamp heads from the blank. This is effected by a pair of actuating links 93 which are connected by way of pivot studs 94 to lugs 95 formed on the levers. The actuating links are shifted in any suitable manner in time with the other moving parts of the apparatus.

The edging is effected by edging steels 98, 99 located in the horn recess 85 and cooperating with the respective anvil irons 86, 87. The edging steels are mounted on a rocker bar 101 which is formed with trunnions carried in bearings formed in the main frame 72. The rocker bar is oscillated through a first operation bending arc which starts the forming of the hooks and thence through a second operation bending arc which completes the hooks. This is a usual edging operation and is brought about in time with the other moving parts of the apparatus.

Interengaging of the hook edges 26, 27 and the bumping of them together to produce the lock side seam 23 is done according to standard practice at a bumping station also located along the mandrel 82 of the apparatus (Fig. 5.) The sides of the curved body 24 are forced inwardly, first one side and then the other in succession by side wings 105 which are mounted on independently movable rods 106 carried in bearings 107 formed in the main frame 72 of the apparatus. The rods are actuated in suitable manner.

As a mechanism of this sort, the reduced diameter portion of the mandrel 82 includes expansible sizing side members 108 which are spread apart by a reciprocable expander plug member disposed in the mandrel. It is this expanding action which spreads the body to its full diameter size and brings its overlapped hooks 26, 27 into interengagement as shown in Fig. 8.

Compression of the hooks is brought about by a vertically reciprocating bumping hammer 111 which is located under the mandrel and which slides in a bearing block 112 formed in the main frame 72. The hammer is actuated in suitable manner in time with the other moving parts of the apparatus and flattens the bead ends, as previously explained. The resulting vented side seam is shown in Figs. 9, 10 and 11.

The bumping of the side seam 23 is followed by the usual soldering operation. By reason of the vented condition of the side seam, there is no trapped air as the air within the seam escapes into the interior of the formed container body through the vent channels formed by the flattened reenforcing bead ends within the seam. Fig. 6 indicates this soldering operation as the body moves along the mandrel 82 and over a rotating solder roll 115. The solder roll 115 rotates in a bath of molten solder 116 retained in a reservoir 117. The solder is maintained in a heated fluid condition in the usual manner.

It is by reason of the vents in the side seam that the solder bonds together the layers of the seam in an improved joint so that the beaded construction of can body thus plays a double role, first by reenforcing the body wall and second by reenforcing the usually vulnerable side seam area.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. A method of producing a reenforced tubular sheet metal can body having surrounding longitudinally spaced reenforcing beads in turn having their opposite ends extending into the side seam to reenforce the seam by insuring proper venting thereof during soldering thereof, said method comprising beading a flat can body blank from one edge across to the opposite edge thereof to reenforce the same while coincidently and in the same operation forming said beaded blank into tubular shape as a partially reenforced can body with the said beads extending around the body wall from one edge to the other, edging said beaded body wall by bending its opposite edges into hooks so that the bent area includes the opposite ends of the beads, interlocking said hooks in a side seam containing the bead ends in radially aligned relation to constitute vent channels in the completely formed can body, and applying molten solder to said body to fill said vent channels and to bond together parts of the side seam as a reenforced seam.

2. A method of producing a reenforced tubular sheet metal can body having surrounding longitudinally spaced reenforcing beads in turn having their opposite ends extending into the side seam to reenforce the seam by insuring proper venting thereof during soldering thereof, said method comprising beading a flat can body blank from one edge across to the opposite edge thereof to reenforce the same while coincidently and in the same operation forming said beaded blank into tubular shape as a partially reenforced can body with the said beads extending around the body wall from one edge to the other, edging said beaded body wall by bending its opposite edges into hooks so that the bent area includes the opposite ends of the beads, interlocking said hooks in a side seam containing the bead ends in radially aligned relation to constitute vent channels in the completely formed can body, compressing said seam to flatten portions of said beads in the seam area while leaving the remaining portions of said beads unflattened, and finally applying molten solder to said body to fill said vent channels and to bond together parts of the side seam as a reenforced seam.

NELSON GEERTSEN.

REFERENCES CITED

The following references are of record in the file of this patent:

UNITED STATES PATENTS

| Number | Name | Date |
| --- | --- | --- |
| 1,813,520 | White | July 7, 1931 |
| 1,966,392 | Hodgson | July 10, 1934 |
| 2,167,737 | Anderson | Aug. 1, 1939 |
| 2,235,377 | Laxo | Mar. 18, 1941 |
| 243,897 | Hill | July 5, 1881 |